United States Patent [19]

Beer

[11] Patent Number: 4,767,307
[45] Date of Patent: Aug. 30, 1988

[54] APPARATUS FOR THE PRODUCTION OF SPHERICAL PORTIONS OF ICE-CREAM

[75] Inventor: Richard Beer, Nuremberg, Fed. Rep. of Germany

[73] Assignee: Schöller Lebensmittel GmbH & Co. KG, Nuremberg, Fed. Rep. of Germany

[21] Appl. No.: 900,805

[22] Filed: Aug. 27, 1986

[30] Foreign Application Priority Data

Aug. 28, 1985 [DE] Fed. Rep. of Germany ....... 3530682

[51] Int. Cl.⁴ ...................... B29C 33/42; B29C 39/26; A23G 9/22
[52] U.S. Cl. ...................................... 425/394; 62/341; 62/345; 62/356; 425/403; 425/406; 425/409
[58] Field of Search .................. 425/120, 127, 126 R, 425/216, 280, 282, 383, 394, 406, 408, 409, 385, 459, 265, 425, 426, 436 R, 447; 62/340, 341, 345, 356

[56] References Cited

U.S. PATENT DOCUMENTS

| 817,045 | 4/1906 | Clark | 425/268 |
|---|---|---|---|
| 851,558 | 4/1907 | Polk | 425/268 |
| 1,647,944 | 11/1927 | Villasenor | 425/216 |
| 2,412,050 | 12/1946 | Lawrence et al. | 425/280 |
| 2,571,729 | 10/1951 | Lawrence et al. | 425/280 |
| 2,759,434 | 8/1956 | Hensgen et al. | 426/512 |
| 3,064,591 | 11/1962 | Van Zandt | 425/126 R |
| 3,126,841 | 3/1964 | Nay | 425/126 R |
| 3,907,472 | 9/1975 | Lutsey | 425/127 |
| 4,012,185 | 3/1977 | Poore et al. | 425/120 |

FOREIGN PATENT DOCUMENTS

| 365150 | 12/1981 | Austria . |
| 1532382 | 10/1970 | Fed. Rep. of Germany . |
| 1448594 | 6/1966 | France . |
| 7612388 | 5/1978 | Netherlands . |
| 2021381 | 12/1979 | United Kingdom . |
| 2139337 | 11/1984 | United Kingdom . |

Primary Examiner—Willard E. Hoag
Attorney, Agent, or Firm—Spencer & Frank

[57] ABSTRACT

Apparatus for the production of spherical portions of ice-cream. The apparatus includes means for introducing an ice-cream mixture having a creamy consistency into a hemispherical lower mould in a sufficient quantity to fill the mould and form a protruding cap having the same volume as that of the mould;

means for smoothing the protruding cap into the shape of a hemisphere being a smoothing tool comprising a portion of the generatrix of a hemisphere which describes on rotation a hemispherical shape;

means for freezing the completed sphere of ice-cream; and means for removing the sphere of ice-cream from the mould.

The smoothing tool has the shape of a hemisphere, onto the crown of which there is fastened an extension piece, its generatrix being perforated in between some remaining segments.

8 Claims, 2 Drawing Sheets

APPARATUS FOR THE PRODUCTION OF SPHERICAL PORTIONS OF ICE-CREAM

The invention relates to a method for the production of spherical portions of ice-cream, as well as to an apparatus for use in the process and individual devices forming part of the apparatus.

It is know and quite common to serve ice-cream in the shape of scoops in sundae glasses, bowls or suchlike. In cafes these scoops are produced using special shaping scoops delivering an exact portion. With these implements a predetermined amount of ice-cream is taken from the bulk of the ice-cream and the amount taken out is shaped by the spherically designed scoop-part of the implement. To release the portion of the ice-cream contained in the implement, the scoop-part is opened, whereupon the scoop of ice-cream falls out and is put immediately into the serving dish.

It is also known to shape factory produced ice-cream into scoops after the manufacturing process. One of the possible methods for doing this is to fill hemispherical bowls with the ice-cream mixture and to freeze them. Thus hemispherical ice-cream scoops are formed, which when taken from the mould may be fitted together to form completely round sphere-shaped Another possibility for shaping spherical ice-cream portions consists in filling an ice-cream mixture through a filling slot into a spherical mould and then freezing the ice-cream in the mould. After completion of the freezing process the spherical mould is opened and the contents, which are now spherical in shape, are removed. A process of this type is described for example in Austrian Pat. No. 365 150.

The known methods and devices for the factory production of spherical ice-cream portions are costly and can either not be automated at all or else only with great difficulties.

It is therefore the object of the invention to provide a method for the manufacture of spherical ice-cream portions, which can be simply executed on a continuous production line and where no manual operations are necessary for its implementation. A further object of the invention is to provide an apparatus for carrying out the method and individual devices used in the apparatus.

According to the invention there is provided a method of forming a portion of ice-cream into a substantially spherical shape comprising the steps of:

introducing an ice-cream mixture having a creamy consistency into a hemispherical lower mould in a sufficient quantity to fill the mould and form a protruding cap having the same volume as that of the mould;

smoothing the protruding cap into the shape of a hemisphere with a smoothing tool comprising a portion of the generatrix of the hemisphere which describes on rotation a hemispherical shape;

freezing the completed sphere of ice-cream; and removing the sphere of ice-cream from the mould.

The method may be easily carried out since the creamy already pre-frozen ice-cream mixture can still be exactly measured because of its consistency, but on the other hand is solid enough to form a cap above the filled hemispherical mould. Another essential point was the realization that the protruding cap could be smoothed down by means of a rotating tool in such a way that it takes on the shape of the upper half of a sphere. For this the tool should describe a hemisphere when rotating, which means that the tool itself is a segment of the generatrix of a hemisphere.

After the cap above the half-mould is shaped, the mould and its contents are further hardened by deep-freezing. In this state it can no longer be shaped, but can be easily removed from the mould.

In another aspect the invention provides an apparatus for carrying out the method of the invention, the apparatus comprising.

at least one hemispherical lower mould;

a dispenser for dispensing a portion of ice-cream;

a smoothing tool for smoothing the ice-cream into a spherical shape, the tool being mounted for rotational movement and comprising a portion of the generatrix of a hemisphere to describe a hemispherical shape on rotating;

a deep freezing installation through which the lower moulds are led either step-by-step or continuously; and at least one removal device for removing completed spheres of ice-cream from the mould.

The simplest case would be, where the hemispherical lower mould takes only one portion of ice-cream. It is much more economical, however, if a plurality of hemispherical lower moulds are combined to form one unit.

The invention also provides a tool for smoothing ice-cream comprising a member formed by a segment of the generatrix of a hemisphere which describes on rotation a hemispherical shape. The smoothing tool preferably has the shape of a hemisphere, onto the crown of which a tube or rod-shaped extension piece is fastened, its generatrix being perforated in between some remaining segments. Thus, one single segment may be formed, but there may also be several, for example three segments present, which are then connected to each other by an annular ring, preferably at their equatorial end.

It is particularly beneficial for the segments to have a shovel-like curvature at their mouth. This ensures that part of the ice-cream mixture to be smoothed, which may be protruding, is pressed down so that there is no loss of ice-cream and particularly no smudging on the outside of the tool.

The lower mould is fed step-by-step through the whole arrangement during the execution of the process. First of all it is conveyed to the portion dispensing device, where the number and the alignment of the individual portion dispenser tubes corresponds to the number and the alignment of the hemispherical receptacles of the bottom mould.

After completion of the filling process, the mould proceeds to the smoothing station. At this station the above described rotating smoothing tools are provided. The number and the alignment of these tools corresponds to the number of the receptacles for the ice-cream portions. The tools are moved down step-by-step and are then set rotating together. After completion of the smoothing operation the tools are lifted again, whereupon the mould with the now completed scoops of ice-cream is advanced to the next station. This next station is deep freezer tunnel or deep-freezing room, where the scoops are hardened by lowering the temperature. After emerging from the deep freezer tunnel, the moulds containing the now hardened scoops of ice-cream reach the removal device, where the lower moulds may be slightly warmed by a hot air blower or suchlike or may be set vibrating by a suitable vibrating device. It has proved beneficial for the removal device to comprise two spiked prongs, which rotate around a shared central axis and which may be moved up and down along this axis. By means of these spiked prongs, the scoops can easily be picked up and are removed from the mould by lifting them out. During the next step in the operational cycle a suitable packaging unit is pushed under the scoops and the scoops are stripped off the prongs, which can be done by a jerking movement or by using a stripper bar or the like.

The invention will be more clearly understood from the following description, given by way of example only, with reference to the accompanying drawings in which.

Figure 1:
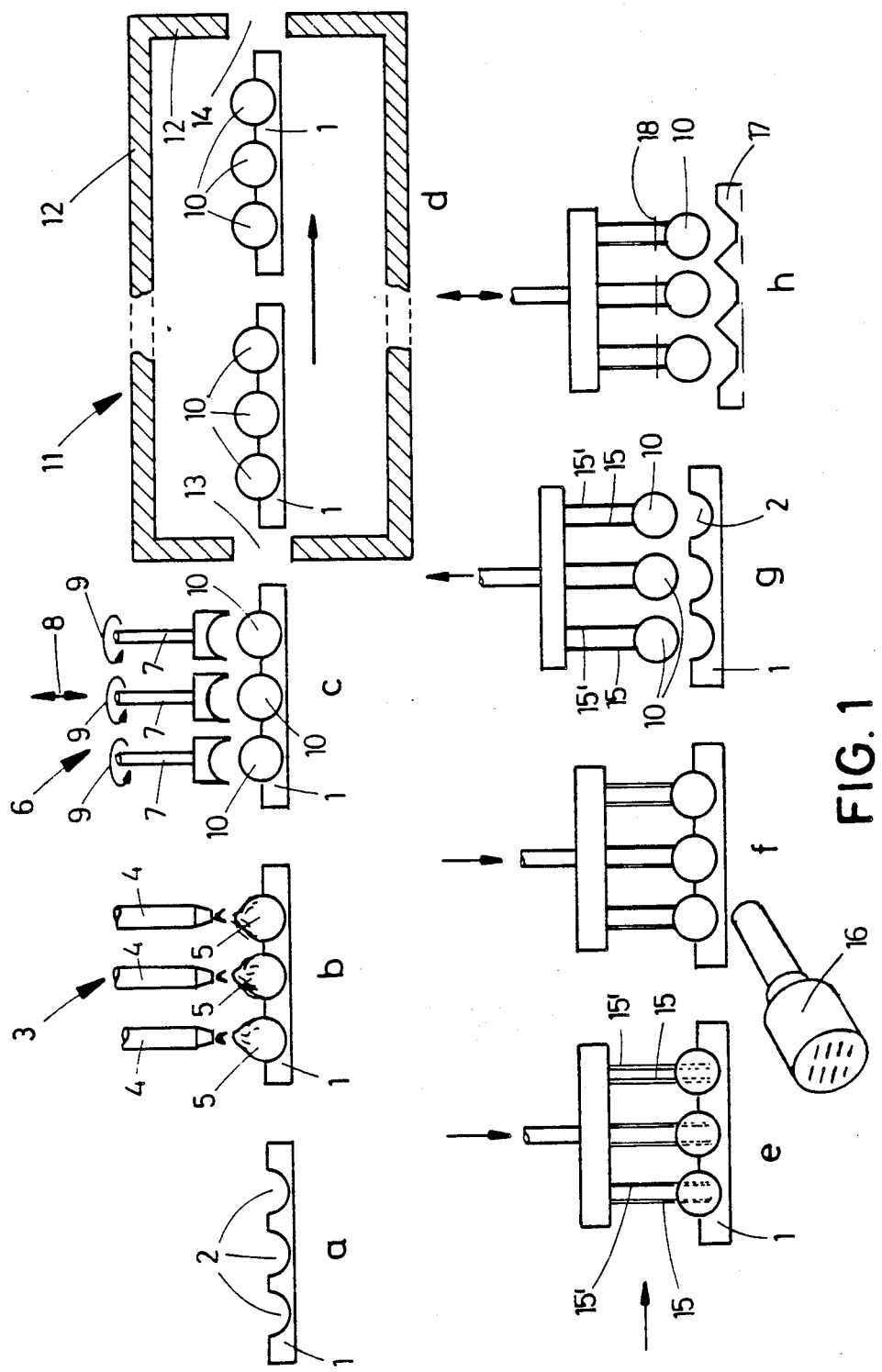
FIG. 1 is a schematic flow diagram of the method and apparatus of the invention.

Referring to FIG. 1a there is illustrated the outline of a lower mould 1, comprising three hemispherical shaped depressions 2, which serve as receptacles for the ice-cream mixture. Advantageously the lower mould 1 is made of stainless steel.

During the course of continuous or step-by-step manufacturing process, the lower mould is first moved to portion dispensing station 3 (FIG. 1b), where it is filled with the necessary amount of ice-cream mixture, which has a creamy consistency. The portion dispensing station has a number of portion dispenser tubes 4, which are aligned with the depressions 2 of the lower mould 1. During each operational cycle the portion dispenser tubes 4 dispense an amount of creamy ice-cream mixture, sufficient to fill the depressions 2 completely and to form a protrusion, a so-called cap, the volume of which corresponds to the volume of the depression 2. The dispensed ice-cream portions, which are not spherical in shape at this stage, are illustrated in FIG. 1b at 5.

During the next operational step, the lower mould 1 is moved to the smoothing station 6. At this station a number of smoothing tools 7 are mounted; the number and alignment of these tools corresponds to the number of depressions in the lower mould 1. The tools may be moved up and down in the direction of the double arrow 8 and may rotate in the direction of the circular arrow 9. Once the lower mould 1 has been placed in the operational position during the step-by-step execution of the process the smoothing tools 7 are initially set rotating and then slowly lowered. They press and smooth the upper cap of the ice-cream mixture into the shape of a hemisphere. Once the shaping operation is complete, the tools are lifted again and the individual ice-cream portions now have the shape of spherical scoops 10. The shaping of the ice-cream portions is now complete, but they are still easily deformed. Next they move to treatment station 1d, i.e. the deep-freezing installation 11. Advantageously this deep freezing installation is a deep-freezer tunnel operating with circulating air, its dimensions corresponding to the efficiency required. The tunnel is only schematically outlined in FIG. 1d. In this representation it consists of tunnel walls 12 with a tunnel entrance 13 and a tunnel exit 14. The transport and cooling installations have been omitted from the drawing for the sake of clarity.

When travelling through the tunnel, i.e. the deep-freezing installation 11, the scoops 10 are deep-frozen to such a degree that they are solid enough not to be deformed during further processing.

The lower mould with the deep-frozen scoops contained therein next reaches the removal station or removal device 1e. In this removal device at least two spiked prongs 15, 15' are allocated for each scoop 10. The prongs are rotatable about a common central axis and are movable up and down along the axis of rotation. To remove the scoops from the mould the prongs are inserted into the scoops and the device is lifted, whilst rotating slightly around the shared central axis. This rotation causes the scoops to come loose easily from the depressions 2 and thus from the lower mould 1. This process is shown in FIG. 1, partial views e, f and g In order to make the unmoulding easier, the lower mould 1 may be slightly heated during this process, for instance by a hot air blower 16.

After lifting the scoops 10 (FIG. 1g), a suitable packaging material, e.g. a plastic tray 17 comprising depressions, is put into the required position. The scoops can then easily be set down by or stripped off the prongs, e.g., by an upward-pulling movement or by using stripper bars 18.

Figure 2:
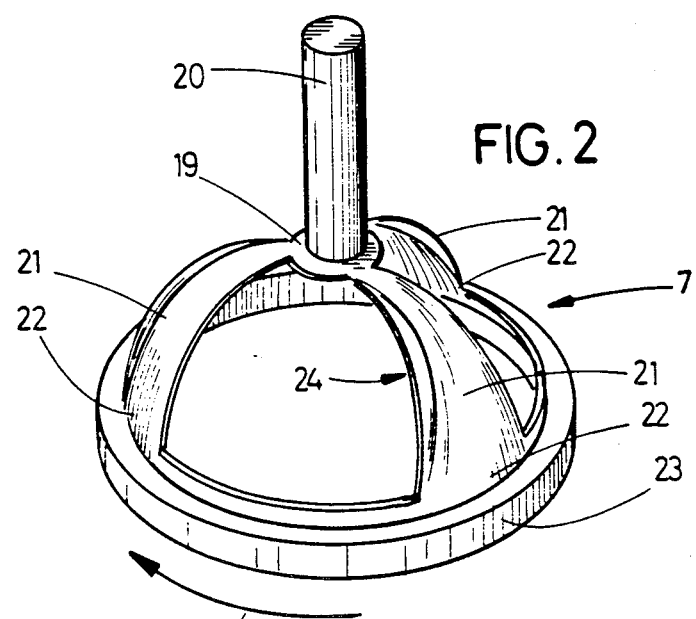
FIG. 2 is a perspective view of a smoothing tool according to the invention.

In FIG. 2 of the drawing, a preferred embodiment of smoothing tool according to the invention is illustrated, the tool being generally indicated by the reference number 7. The tool is in the shape of a hemisphere and at its crown 19 a tube or rod-shaped extension piece 20 is fixed. The generatrix of the tool is perforated in between some remaining segments 21. In the embodiment shown, there is a total of three such segments, which are connected to each other by means of an annular ring 23 at their equatorial end. In this way a compact and non-deformable tool is created, which may be used at the smoothing station FIG. 1c.

It has proved benefical for the segments 21 to have a shovel-like curvature at their mouth 24. When the tool is rotating in the direction of the arrow 25, these shovel-like curvatures are in front and gather all the protruding ice-cream mixture, which they guide under the respective segment 21 for smoothing.

Figure 3:
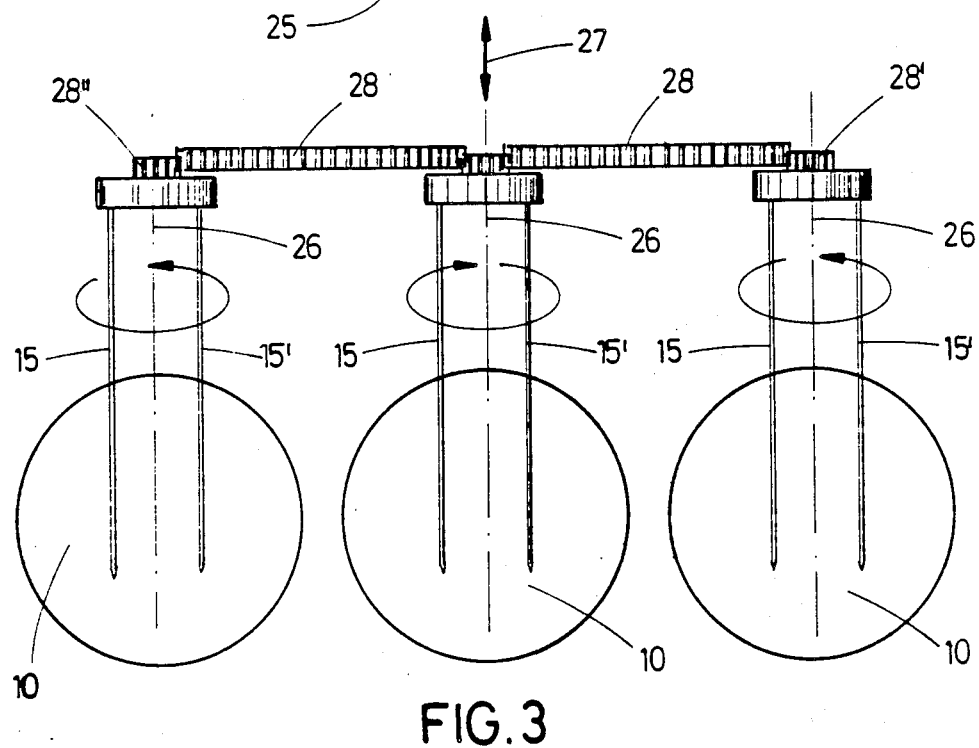
FIG. 3 is a perspective of a removal device forming part of the apparatus.

In FIG. 3 an embodiment of a removal device according to FIGS. 1e to 1h is represented diagrammatically. Two spiked prongs 15, 15' are allocated for each scoop of ice-cream 10.

The prongs allocated to one scoop can be rotated around a shared central axis 26 and can be moved up or down in the direction of the double arrow 27. The rotation in the embodiment shown is carried out by a toothed gear 28, 28', 28". Any other suitable device may be used including the single drive of individual pairs of toothed wheels.

I claim:

1. An arrangement for the production of spherical portions of ice-cream, comprising:
   (a) at least one hemispherical lower mould;
   (b) at least one portion dispenser device for the creamy ice-cream mixture;
   (c) at least one smoothing tool in the shape of a hemisphere with a segmented generatrix, which can be rotated and moved up and down;
   (d) a deep-freezing installation through which the lower moulds are taken either step-by-step or continuously;
   (e) at least one removal device for the finished ice-cream scoops.

2. Apparatus for forming a portion of ice-cream into a substantially spherical shape, comprising at least one hemispherical lower mold; a dispenser for dispensing a portion of ice-cream; a smoothing tool for smoothing the ice-cream into a sperical shape, said tool being mounted for rotational movement and comprising a portion of the generatrix of a hemisphere to describe a hemispherical shape on rotation; a deep-freezing installation through which the lower mold is led; at least one removal device for removing completed spheres of ice cream from said mold; said smoothing tool including a substantially hemispherical shell having a concave inner surface formed by spaced-apart shell wall segments which extend in both the latitude and longitude directions and which engage ice-cream on rotation of said tool to smooth it into a hemispherical shape.

3. Apparatus as claimed in claim 2 wherein the apparatus comprises a plurality of hemispherical lower moulds which are combined to form a single unit.

4. Apparatus as claimed in claim 2 wherein the segments of smoothing tool are connected to each other at their equatorial ends by an annular ring.

5. Apparatus as claimed in claim 2 wherein the leading edge of each segment of the smoothing tool includes a shovel-like curvature for engaging ice-cream.

6. Apparatus as claimed in claim 2 wherein the smoothing tool includes a stub extension piece extending from the crown of the shell.

7. Apparatus as claimed in claim 2 wherein the removal device for completed spheres of ice-cream comprises at least a pair of spikes or prongs for engaging an ice-cream sphere.

8. Apparatus as claimed in claim 7 wherein the prongs are rotatable about a common central axis and are movable upwardly and downwardly to engage and disengage from an ice-cream sphere.

* * * * *